United States Patent [19]

Driscoll et al.

[11] 4,114,166

[45] Sep. 12, 1978

[54] SELF-DEVELOPING CAMERA AND VIEWER

[75] Inventors: John J. Driscoll, Andover; Richard R. Wareham, Marblehead, both of Mass.

[73] Assignee: Polaroid Corporation, Cambridge, Mass.

[21] Appl. No.: 749,511

[22] Filed: Dec. 10, 1976

[51] Int. Cl.² .......................................... G03B 29/00
[52] U.S. Cl. ........................................ 354/76; 354/86;
354/212; 354/276; 40/490; 206/456
[58] Field of Search ................ 40/36, 64 A; 354/212,
354/75, 76, 78, 79, 83, 86, 174, 178, 179, 180,
181, 182, 275, 276, 277; 206/454, 455, 456;
353/103, 111, 112, 116, 118

[56] References Cited

U.S. PATENT DOCUMENTS

| 786,883 | 4/1905 | Edmonds | 353/118 |
|---|---|---|---|
| 2,854,903 | 10/1958 | Land et al. | 354/86 |
| 2,900,074 | 8/1959 | Windman | 206/456 |
| 2,942,365 | 6/1960 | Badalich | 206/456 |
| 3,045,816 | 7/1962 | King | 206/456 |
| 3,170,370 | 2/1965 | Mulch | 353/115 |
| 3,180,697 | 4/1965 | Mulch | 206/456 |
| 3,187,890 | 6/1965 | Brown | 206/456 |
| 3,225,670 | 12/1965 | Friedman et al. | 354/86 |
| 3,350,990 | 11/1967 | Finelli et al. | 354/86 |
| 3,369,469 | 2/1968 | Downey | 354/86 |
| 3,369,470 | 2/1968 | Downey | 354/86 |
| 3,446,127 | 5/1969 | Silverman et al. | 354/79 |
| 3,446,131 | 5/1969 | Cook et al. | 354/83 |
| 3,525,293 | 8/1970 | Harvey | 354/86 |
| 3,541,937 | 11/1970 | Nerwin | 354/86 |
| 3,541,938 | 11/1970 | Harvey | 354/85 |
| 3,575,081 | 4/1971 | Nerwin | 354/79 |

Primary Examiner—L. T. Hix
Assistant Examiner—Alan Mathews
Attorney, Agent, or Firm—John S. Vale

[57] ABSTRACT

A self-developing camera for exposing, processing, viewing and storing self-developing film units, preferably of the small format transparency type. The camera includes a storage chamber for receiving a supply cassette holding a stack of film units therein, an exposure station, a processing or pressure applying station, and a storage chamber for receiving a storage cassette in which the film units are stored after exposure and the application of a compressive pressure thereto. A movably mounted film viewer on the camera is operative to move a processed film unit out of the storage cassette for viewing and back into the storage cassette for storage without the user of the camera having to manually handle or manipulate the film unit.

48 Claims, 13 Drawing Figures

SELF-DEVELOPING CAMERA AND VIEWER

BACKGROUND OF THE INVENTION

1. Field of the Invention

The present invention relates to the field of photography and, more particularly, to miniature selfdeveloping cameras.

2. Description of the Prior Art

The term -miniature- as used in this disclosure in connection with self-developing cameras is descriptive of the relatively small physical size of both the camera and self-developing film units used therein. In general, these cameras are configured for use with a small format self-developing film unit that has an image forming area more closely approximating a 35mm frame than the much larger and more conventional "snap shot size" frame.

Most miniature self-developing cameras found in the prior art are configured for exposing and processing "instant slides", i.e., positive image transparencies which are premounted in a cardboard or plastic frame to facilitate viewing or projection subsequent to processing. Some of these cameras also include an integral or attachable magnifying slide viewer so that the photographer may examine the details of the slide after processing.

Generally, such cameras include a supply chamber or receptacle for holding a stack of instant slides or receiving a cassette or magazine having a stack of slides preloaded therein, an exposure station where a slide is located for exposure, pressure applying means for applying a compressive pressure to the exposed film unit to release a fluid processing composition from a rupturable container on the film unit and to distribute the fluid between predetermined layers of the film unit thereby initiating a development of diffusion transfer process, an imbibition chamber or station providing a light tight environment for the film unit after fluid distribution to protect the film unit from further exposure until the processing is complete; and a film transport system for moving the film unit between its various positions within the camera housing during a cycle of camera operation.

For representative examples of the prior art relating to miniature self-developing cameras, reference may be had to U.S. Pat. Nos. 2,854,903; 3,255,670; 3,350,990; 3,369,469; 3,369,470; 3,421,423; 3,437,023; 3,437,024; 3,446,127; 3,446,131; 3,455,222; 3,541,939; 3,541,940; 3,541,937; 3,541,938; 3,575,081; 3,525,293; 3,614,920; 3,648,527; and 3,636,844.

A major deficiency of the prior art camera relates to the handling of the small transparency slides after processing. The very nature of a small format transparency slide requires that it be carefully handled and stored because finger prints, dust, and small particles of dirt thereon are highly visible when the image on the slide is magnified for direct viewing or projection onto a screen.

To varying degrees, all of the above-noted prior art cameras require that the photographer manually handle the transparency slide after processing, thereby significantly increasing the possibility that slides will become contaminated by finger prints, dust, etc.

For example, with the exception of the camera described in the above-noted U.S. Pat. No. 3,350,990, all of these cameras require the removal of a processed slide from the imbibition chamber before the next film unit in the camera can be processed. At the very minimum, the user must interrupt his picture taking to remove the processed slide and find a dirt and dust free environment for its storage. The camera described in U.S. Pat. No. 3,350,990 has an imbibition chamber which is sufficiently large to receive all of the film units initially loaded into the camera, but if the user wishes to view his results before taking the next picture, he must open the chamber door, manually remove the processed slide therefrom for viewing and then manually reinsert the slide for storage.

The previously noted U.S. Pat. Nos. 2,854,903; 3,255,670; 3,446,127; 3,446,131; and 3,575,081 all include an integral or attachable magnifying slide viewer. Again, the use of the slide viewer is accompanied by the requirement for manually handling of the slide. It must be removed manually from the imbibition chamber and inserted into the viewer.

The camera described in U.S. Pat. No. 2,854,903 uses a transparency film unit having a strippable opaque backing sheet on the under side thereof. This backing sheet is used to prevent exposure by transmission of the underlying slides in the stack when the forwardmost slide is exposed. After exposure, the slide is advanced between a pair of pressure rollers and into a combination imbibition chamber/viewing station. In this position, the backing sheet is used to prevent light passing through a slide viewer eye lens from further exposing the slide until the imbibition period is over. The user then opens the slide viewer door and manually removes the backing sheet. He then closes the door from viewing. Because the imbibition chamber/viewing station has the capacity to hold only one slide at a time, the processed slide must be removed manually before the next slide can be processed. Therefore, the slide is handled twice, once for stripping the backing sheet and once again upon removing the slide from the camera for storage after viewing.

It will be noted that the previously mentioned U.S. Pat. No. 3,541,940 describes a film container or slide magazine having a supply chamber for holding a stack of unexposed transparency film units and a storage chamber for storing the slides after processing. But, once again the photographer is required to manually remove the processed slide from the camera imbibition chamber and insert into the magazine storage chamber.

SUMMARY OF THE INVENTION

The present invention provides a miniature self-developing camera which is characterized by its small physical size and unique features that allow the user to load, expose, process, store, view and unload small format self-developing film units without having to manually handle or manipulate such film units. Thus, the possibility that the image forming area of these film units will be contaminated by finger prints, dirt, dust, etc. is reduced significantly. Also such a camera enhances the enjoyment of picture taking by eliminating the manual film handling procedures that, at best, are a distraction and at times a source of frustration.

In a preferred embodiment, the miniature self-developing camera of the present invention is configured for use with small format self-developing film units of the transparency type, i.e., "instant slides".

These film units are supplied in a cassette or cartride which is loaded into a film supply chamber, or cassette receiving receptacle near one end of the camera housing. Upon manually actuating a slider device on the camera, the first film unit is advanced from the supply cassette to a film exposure position. The film unit is exposed and the slider is actuated once again to effectuate the movement of the exposed slide between a pair of pressure applying members for fluid distribution and into an empty storage cassette or cartridge located in a chamber or receptacle adjacent the rollers and the movement of an unexposed slide from the supply cassette to the exposure position.

The storage chamber also provides the necessary light excluding environment for preventing further exposure of the film unit until the relatively short imbibition period is completed.

To facilitate viewing of the processed slide, the camera includes a built-in magnifying slide viewing device mounted on the camera housing in telescoping relation with the storage chamber for movement between a first or normally retracted position and a second or extended position. To view the processed slide, the user merely moves or pulls the viewer outwardly from the camera housing. This movement causes the processed slide to be moved with the viewing device from its storage position within the storage cassette to a viewing position. Preferably, the viewing position is substantially exteriorly of the camera housing. After viewing, the user pushes the viewing device inwardly toward the camera housing to its retracted position which causes the slide to be reinserted into the storage cassette. The storage cassette has sufficient capacity to receive all of the film units, initially held in the supply cassette, and therefore the photographer does not have to manually unload each film unit after processing.

In a preferred embodiment, the supply and storage cassettes are identical. When the original supply cassette is empty, it is merely transferred to the storage chamber where it functions as a storage cassette. Also, the cassette holding the stack of processed slides may be transferred directly to a viewing device or projector without having to remove the slides therefrom.

In a preferred embodiment, the miniature camera comprises a compact elongated parallelepiped shaped camera housing and includes the following internal structures located in alignment or side-by-side relation along the long dimension of the camera housing. A receptacle chamber for receiving a supply cassette holding a stack of unexposed film units; an exposure station including means for locating a film unit in position for exposure, a processing station including a pair of pressure applying rollers; a receptacle chamber for receiving a film storage cassette; and a viewfinder for framing the subject or scene to be photographed. The slider device preferably includes first and second film advancing means for moving, respectively, a film unit from the supply cassette to the exposure position and an exposed film unit from the exposure position into the bite of the pressure applying rollers. The slider also preferably is coupled to at least one of the rollers such that it drivingly rotates the roller, as the slider is advanced along its linear path of travel, to cause the film unit to be advanced through the rollers and into the storage cassette.

The slide viewer is preferably mounted in telescoping relation to the storage cassette chamber for movement relative thereto between its retracted and extended positions. As will be described in detail hereinafter, the slide viewer is adapted to move a processed slide from the storage cassette to the viewing position and back to the storage cassette in directions that are transverse to the direction of movement of a slide that is advanced between the rollers and into the storage cassette. Also, the cassettes have access opening therein which allow movement of the film units in and out thereof along mutually transverse paths of travel.

Therefore it is an object of the present invention to provide a photographic apparatus having novel features which allow a plurality of self-developing film units to be loaded thereinto, exposed, processed, stored, viewed, and unloaded therefrom without the user having to manually handle any of the individual film units.

It is another object of the invention to provide a miniature self-developing camera for exposing and processing small format self-developing film units and including means for moving such film units from a storage position to a viewing position and then back to the storage position without the user having to manually handle such film units.

Another object is to provide such a miniature self-developing camera which includes a slide viewer mounted for movement between first and second positions for moving a film unit from a storage position to a viewing position in response to moving said slide viewer from the first position to the second position and for moving the film unit from the viewing position back to storage position in response to moving the slide viewer from the second position to the first position.

Yet another object is to provide a self-developing camera including a first receptacle or chamber for receiving a cassette holding a plurality of self-developing film units and a receptacle or chamber for receiving a storage cassette adapted to receive a self-developing film unit after it has been exposed and subjected to the application of a compressive pressure, and means for moving a film unit along a path of travel from the supply cassette to the storage cassette.

Another object of the invention is to provide a miniature camera including means for exposing, processing and viewing a self-developing film unit wherein a self-developing film unit is moved in a first direction into a storage position and is moved in a second direction, transverse to the first direction, from the storage position to the viewing position.

Yet another object is to provide such a miniature self-developing camera which includes a device which is actuable to effect the advancement of a film unit from a supply position to an exposure position, the advancement of an exposed film unit from an exposure position to a pair of pressure applying rollers, and provide the rotational drive to at least one of the rollers to cause the exposed film unit to be advanced through the rollers and into a storage position.

Another object of the invention is to provide a cassette for holding a stack of film units and including access openings allowing film movement into and out of the cassette along transverse paths.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
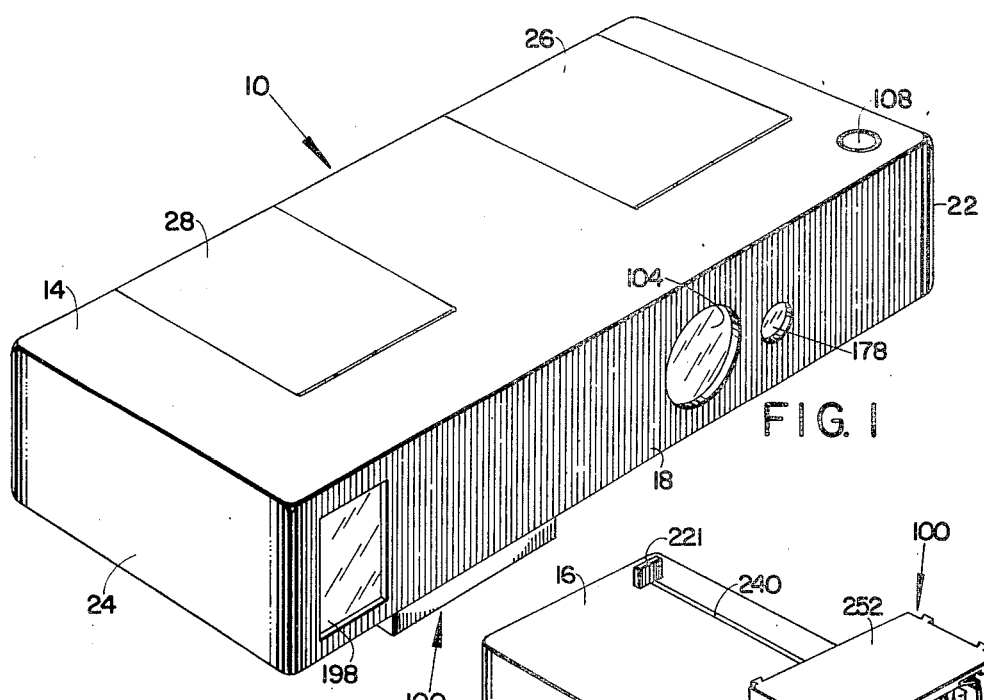
FIG. 1 is a perspective view of a miniature self-developing camera embodying the present invention with its slide viewer located in its retracted position.
Figure 3:
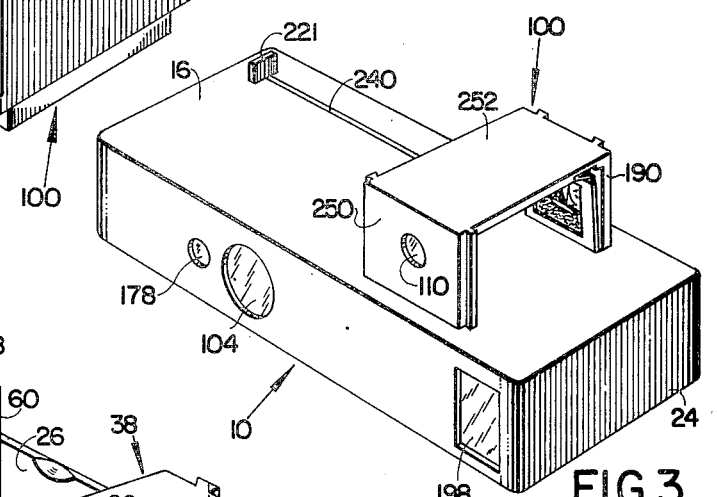
FIG. 3 is a perspective view of the camera of FIGS. 1 and 2 showing it in an inverted position with respect to FIG. 2 to position the extended slide viewer in a convenient orientation for viewing.
Figure 2:
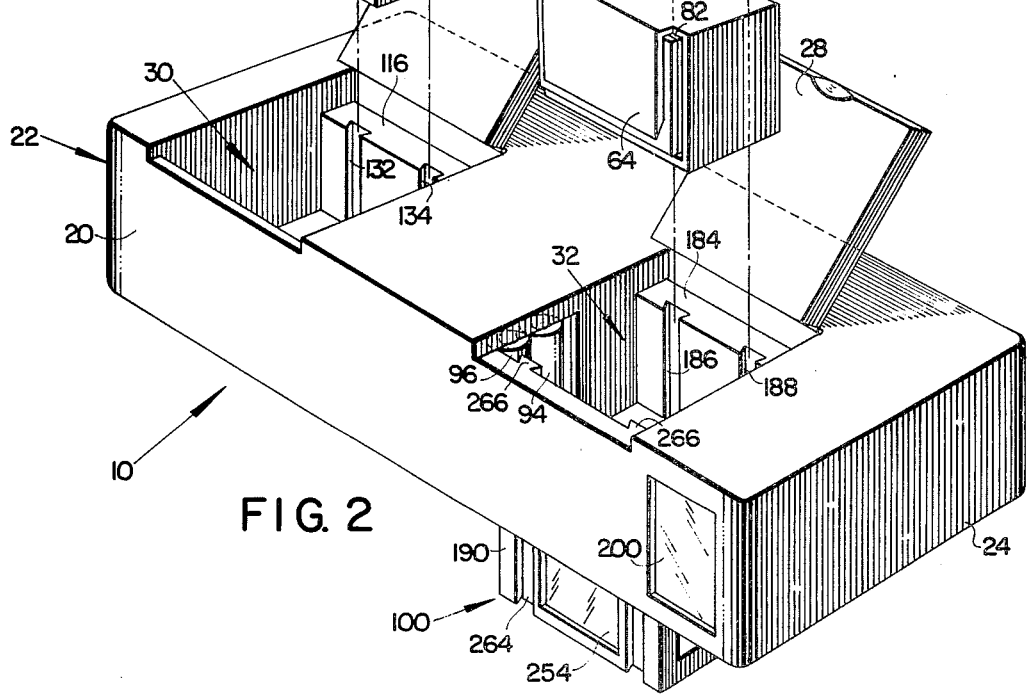
FIG. 2 is a perspective view of the camera of FIG. 1 showing the slide viewer in its extended position and film unit supply and storage cassettes positioned over their respective receiving chambers or receptacles in the camera housing.

FIGS. 1, 2 and 3 of the drawings show various perspective views of a miniature self-developing camera 10 embodying the present invention.

Camera 10 includes a compact, elongated generally parallelepiped shaped camera housing 12 defined by a top wall 14; a bottom wall 16; and a peripheral section, joining walls 14 and 16, defined by a forward wall 18, a rear wall 20, and a pair of lateral side walls 22 and 24. In a preferred embodiment, the exterior dimensions of camera housing 12 are approximately 6 × 2.75 × 1.5 inches. The housing 12 may be of molded plastic construction or formed of any other suitable material.

Located in top wall 14 are a pair of hinged doors 26 and 28 providing access, respectively, to first and second light tight cassette receiving chambers or receptacles 30 and 32 within camera housing 12. Receptacle 30 is adapted to releasably receive a supply cassette 34 holding a stack of small format self-developing film units 36 therein. Receptacle 32 is configured to releasably receive a storage cassette 38 for receiving and storing the film units 36 subsequent to their exposure and processing as will be described in detail later in this disclosure.

In the illustrated embodiment, camera 10 is configured for use with small format self-developing film units of the transparency type, i.e., "instant slides". But, it will be noted that the inventive concepts to be described herein may be applied to a camera designed for use with small format reflection print type film units as well.

Figure 9:
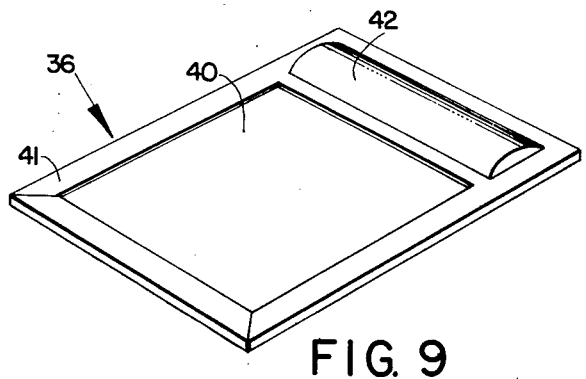
FIG. 9 is a perspective view of a self-developing film unit that is adapted for use with the camera and cassettes embodying the present invention.
Figure 10:
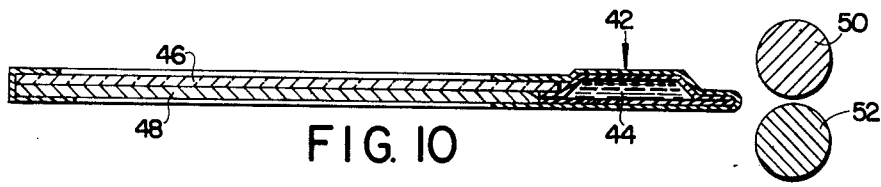
FIG. 10 is a sectional view of the film unit of FIG. 9, diagrammatically showing its internal structure, and a pair of pressure applying rollers.

As best shown in FIGS. 9 and 10, the transparency film unit 36 is of the "integral" type which may be exposed and processed without having to superpose and/or peel apart separate negative and positive elements.

Film unit 36 is rectangular in shape having a generally square image forming area 40 which is bordered by an integral frame 41 including, at one end, a rupturable container or pod 42 holding a supply of fluid processing composition 44. In a preferred embodiment, film unit 36 measures approximately 1.3 × 1 inch providing an image forming area 40 of approximately 20 × 20 mm. It will be understood however that a camera 10, embodying the present invention, may be designed for use with film units having larger or smaller dimensions than the approximate measurements set forth above.

For the sake of clear illustration in FIG. 10, film unit 36 is shown to comprise two superposed sheetlike elements 46 and 48 having pod 42 attached to one end thereof. In actuality, the film unit 36 is preferably a multilayer laminate including, among other layers, photosensitive and image receiving layers and elements 46 and 48 which may each comprise a plurality of layers.

Subsequent to exposure, film unit 36 is adapted to be advanced between a pair of pressure applying members, such as the pair of rollers 50 and 52 shown in FIG. 10 which apply a compressive pressure progressively along the length of the film unit 36 thereby rupturing pod 42 and distributing the fluid processing composition 44 between a pair of predetermined layers of the film unit 36 (as illustrated by the interface between elements 46 and 48) to initiate a well-known development and diffusion transfer process.

In a preferred embodiment, film unit 36 is a transparency type self-developing film unit whch provides a full color positive image for viewing or projection by transmitted light. Also, the integral frame 41 surrounding the image forming area 40 is preferably sufficiently stiff such that the processed film unit 36 may be manipulated in an automatic projector without requiring the film unit 36 to be mounted in an auxiliary slide holder frame or mount. However, it will be understood that the film units 36 may be initially provided in a 2 × 2 inches mount to fit standard slide projectors when used with a slightly larger camera than the illustrated camera 10 or may be mounted in an auxiliary 2 × 2 inches mount after processing if required. The illustrated film unit 36 is also of the type which does not include an integral light opacification system and must be maintained in a light free environment for a short imbibition period following fluid distribution to prevent further exposure of its photosensitive materials while the development process is in progress.

For representative examples of transparency type self-developing film units which may be used with camera 10, reference may be had to U.S. Pat. Nos. 3,536,488; 3,615,428; 3,647,437; 3,721,562; 3,730,716; and 3,894,871, all of which are assigned to the same assignee as the present invention.

The supply and storage cassette 34 and 38 preferably are identical in all respects and may be interchanged. That is, after the film units 36 in a supply cassette 34 have been expended, the empty supply cassette 34 may be transferred from chamber 30 to chamber 32 and serve as a storage cassette 38 therein. Therefore, the following description will apply to both cassettes 34 and 38 and corresponding parts of the two cassettes will carry the same numerical designation in the drawings.

Figure 11:
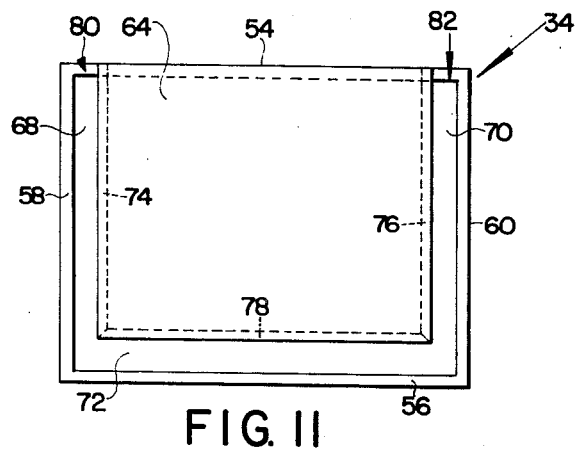
FIG. 11 is an elevational view of a film cassette embodying the present invention.

The cassette is a thin walled box-like structure which in a preferred embodiment may hold up to 20 film units 36 arranged in stacked relation therein. As best shown in FIGS. 2 and 11, it includes a top wall 54, a bottom wall 56, side walls 58 and 60, a rear wall 62 and a forward wall 64. Preferably, the cassette is of molded plastic construction or the like.

The forward wall 64 depends from a central portion of the leading edge of top wall 54 which extends forwardly of the leading edges of side walls 58 and 60 and bottom wall 56 to space the interior surface 66 of forward wall 64 forwardly of the last mentioned leading edges by a distance approximating the thickness of a film unit 36 after processing. The forward wall 64 is parallel to but narrower and shorter than the rear wall 62.

This configuration provides three full size interconnected openings around three sides of the cassette to permit movement of a film unit 36 into and out of the cassette (see FIG. 11). The first two openings 68 and 70 are vertically oriented and parallel and are defined, respectively, by the leading edges of side walls 58 and 60 and the free standing side edges of forward wall 64. These two openings permit movement of a film unit 36 into and out of the cassette along a generally horizontally oriented path of travel. The other or bottom opening 72 is horizontally oriented and is defined by the leading edge of bottom wall 56 and the free standing bottom edge of forward wall 64. Opening 72 is transversely disposed with respect to openings 68 and 70 and permits vertical movement of a film unit 36 into and out of the cassette 34. The need for this vertical movement will become apparent later in the disclosure with reference to moving a processed film unit 36 into and out of the storage cassette 38 for viewing purposes.

It will be noted that the three free standing edges of forward wall 64 are beveled at 74, 76 and 78 to provide inclined camming surfaces for facilitating the movement of a film unit 36 through openings 68, 70 and 72 as will be described later.

By the cassette wall construction described above, a pair of laterally spaced openings or notches 80 and 82, interconnected with openings 68 and 70 respectively, are provided at the top forward end of the cassette which provide access to the top edge of the forwardmost film unit 36 in the stack. As will be described later, access to the top edge of film unit 36 is required to effect its movement through bottom opening 72 for viewing purposes. Alternatively, a single top edge access opening in the top wall 54 may be provied, instead of the two openings 80 and 82. For the purposes of this disclosure, it will be noted that the illustrated cassette includes five (5) openings 68, 70, 72, 80 and 82.

Figure 4:
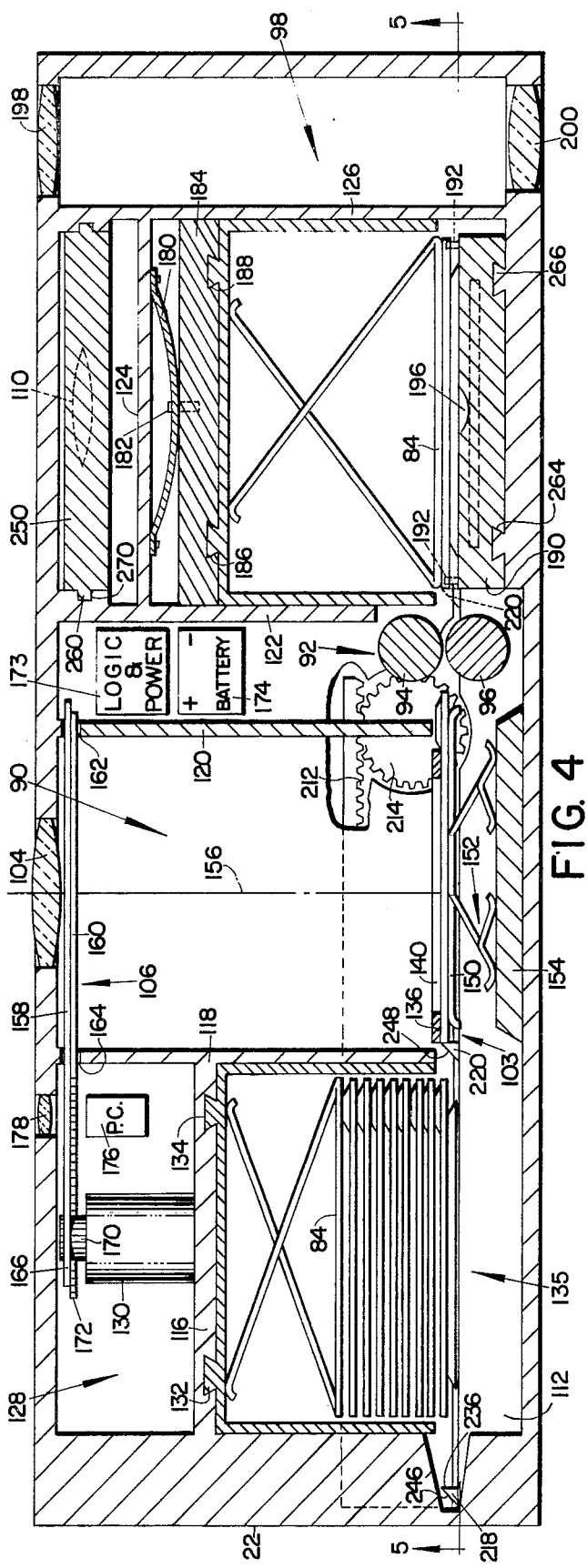
FIG. 4 is a top elevational view, partly in section, of the camera of FIG. 1 with its top wall removed to illustrate the interior structure.

The cassette also includes a spring biased platen 84 therein for urging the stack of film units 36 toward forward wall 64 such that the forwardmost film unit 36 in the stack bears against the interior surface 66 of forward wall 64 as best shown in FIG. 4.

In a preferred embodiment, the cassette also includes a pair of spaced, dovetail shaped, vertically disposed retaining and locating rails 86 and 88 which extend outwardly from and may be integrally formed with cassette rear wall 62. As will be described later, the rails 86 and 88 are adapted to slide into conforming channels within camera receptacles 30 and 32 to accurately locate and retain the cassettes 34 and 38 therein.

As best shown in FIGS. 1–4, the compact thin-line appearance of camera 10 is achieved by grouping major functional areas of the camera in side by side alignment along the long dimension of the camera housing 12 as measured between side walls 22 and 24. From left to right (as viewed in FIG. 4) one finds the supply cassette receptacle 30; a film exposure station and chamber 90, a film processing station 92 including a pair of pressure applying rollers 94 and 96; the storage cassette receptacle 32; and a view finder assembly and chamber 98. Mounted in nesting or telescoping relation with the storage cassette receptacle 32 is an extensible and retractable magnifying slide viewer 100. Located at the bottom of the camera 10 is a manually actuable film advance and roller drive assembly 102 (see FIG. 5). All of these components will be described in detail later.

Briefly, the operation of camera 10 is as follows. A full supply cassette 34 is loaded into receptacle 30 and an empty storage cassette 38 is located in receptacle 32. The slide viewer 100 is located in its retracted position shown in FIG. 1. The user manually advances assembly 102 to the right (as viewed in FIGS. 2 and 4) which causes the first film unit 36 in the stack to be advanced from supply cassette 34 to an exposure position 103 confronting the exposure chamber 90 and an objective lens 104 and shutter 106. After viewing and framing through viewfinder assembly 98, the user actuates a button switch 108 on the left end of camera top wall 14 to operate shutter 106 and effect the exposure of the film unit 36. The assembly 102 is advanced manually once again causing the first film unit 36 to be advanced from the exposure position 103, between rollers 94 and 96 for fluid distribution and into storage cassette 36 in light tight chamber 32, while simultaneously causing the next film unit 36 to be advanced from supply cassette 34 to the exposure position 103.

After a short imbibition period, the processed film unit 36 in storage cassette 38 may be viewed by pulling the slide viewer 100 downwardly from the bottom of camera housing 12 to its extended position (shown in FIG. 2) causing the forwardmost film unit 36 in the storage cassette 38 to be withdrawn from cassette 38 such that it is located in operative relation with the magnifying optics of viewer 100. By turning the camera over, as shown in FIG. 3, the user may view the slide through a magnifying eye lens 110 of viewer 100. The slide is returned automatically to the forwardmost position in storage cassette 38 when the viewer 100 is pushed inwardly toward its retracted position. After all of the film units 36 have been exposed and processed, the user removes storage cassette 38 from chamber 32. The cassette 38 may then be used for permanent storage of the slides 36 and serve as a vehicle for inserting the slides into a viewer or projector.

Camera 10, therefore, has unique features which allow a user to load, expose, process, store, view, and unload a plurality of small format self-developing film units without having to manually handle these small film units and subject them to the possibility of damage or deterioration due to finger prints, dirt, dust, scratching, etc.

As best shown in FIGS. 4, 5, 6, 7 and 8, camera 10 includes a generally planar interior bottom wall or floor 112 disposed over the bottom wall 16 of camera housing 12 and spaced therefrom to define a thin hollow chamber or channel 114 therebetween. As will be described later, channel 114 houses and provides a slide track for certain portions of the film advance and roller drive assembly 102.

Extending upwardly from interior floor 112 are a plurality of vertically disposed and fixedly positioned interior walls, 116, 118, 120, 122, 124 and 126 which serve to subdivide the interior of camera housing 12 into its functional areas.

Wall 118 is located in a plane which is normal to front and rear walls 18 and 20 and as parallel to side walls 22 and 24. It extends rearwardly from front wall 18 to a point adjacent the left end of exposure position 103. Vertically, it extends to the interior surface of top wall 14.

Wall 116 extends laterally between the interior surface of left side wall 22 and interior wall 118 in a plane that is normal thereto and serves to divide the left end of camera 10 into the rear supply cassette chamber or recepacle 30 and a forward compartment 128 for housing a later-to-be-described shutter drive electrical stepping motor 130 and portions of shutter 106.

As best shown in FIGS. 2 and 4, the supply cassette receiving chamber or receptacle 30 is bounded at its sides by portions of walls 22 and 18, top and bottom by door 26 and floor 112, respectively, and forwardly by wall 116 and to the rear by rear wall 20.

In a preferred embodiment, dividing wall 116 has a pair of vertically disposed, integrally formed dovetail shaped channels 132 and 134 therein for slidably receiving the dovetail rails 86 and 88 on supply cassette 34 for the purposes of guiding the cassette 34 into and out of chamber 30 and for accurately locating cassette 34 within camera housing 12, so that the forwardmost film unit 36 therein is located in position to be advanced to the exposure position 103. In its operative position within chamber 30, horizontal movement of cassette 34 is restrained by the engagement therewith of walls 22, 118 and 116 and the interlocking cooperation of channels 132 and 134 with rails 86 and 88. The forward wall 64 of the cassette 34 is not engaged by camera structure and there is a space 135 left between cassette forward wall 16 and rear wall 20 of housing 12. Vertically, the cassette 34 is located and restrained by floor 112 and door 26.

In the illustrated embodiment, wall 116 is slightly shorter than the height of cassette 34 providing access to the top end of cassette rear wall 62 when door 26 is open. This structure and the space 135 allows the user to grasp the top ends of cassette rear wall 62 and forward wall 64 for removing cassette 34 from chamber 30. It will be understood however that other structures, such as providing semicircular grooves or finger holes in walls 22 and 118, may be employed to gain access to cassette 34 for removing it from chamber 30.

The exposure chamber 90, just to the right of chamber 30, is bounded on its sides by wall 118 and parallel wall 120. Exposure chamber 90 extends rearwardly from forward wall 18 to a film locating aperture plate 136 and is bounded top and bottom by top wall 14 and interior floor 112.

Figure 5:
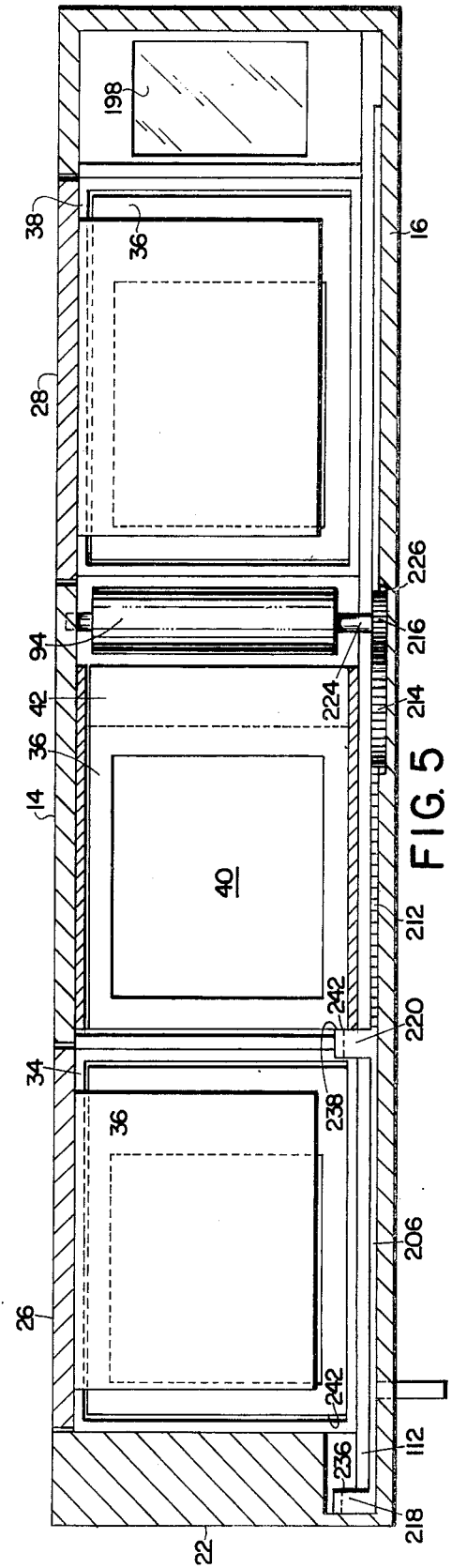
FIG. 5 is a rear elevational view, partly in section, of the camera of FIG. 1, with its rear wall removed to show interior structure.
Figure 8:
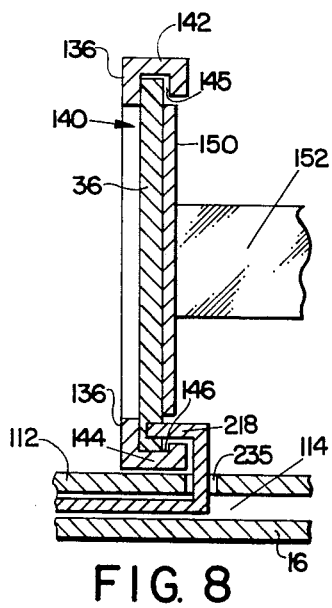
FIG. 8 is a side sectional view of the camera's exposure position and a portion of a film advance mechanism.

As best shown in FIGS. 4, 5 and 8, aperture plate 136 confronts the objective lens 104 mounted in forward wall 18 and has a generally square aperture 140 therein which is coxtensive with the image forming area 40 of a film unit 36. Extending rearwardly from the top and bottom edges of plate 136 are a pair of L-shape flanges 142 and 144 which, respectively, form top and bottom horizontal film guide and locating channels 145 and 146 which are aligned with the forwardmost film unit 36 in supply cassette 34 and are adapted to slidingly receive, respectively, the top and bottom edges of a film unit 36 advanced thereinto from cassette 34.

Positioned behind plate 136 is a pressure plate 150 which is spring biased toward plate 136 by means of an integral spring assembly 152 having its foot portion attached by any suitable means (not shown) to a mounting pad 154 secured to or integrally formed with housing rear wall 20.

It will be noted that film units 36 are stacked in cassette 34 with the relatively thick fluid holding pods 42 facing the forward wall 18 of camera housing 12. As the forwardmost film unit 36 is advanced from cassette 34, it is introduced between the back side of aperture plate 136 and the forward side of pressure plate 150. To accommodate the relatively thick pod 42, pressure plate 150 moves rearwardly against the bias of spring 152. The spring force of spring 152 is chosen so that the compressive force applied to pod 42 by plates 136 and 150 as it advances therebetween is not sufficient to cause pod 42 to rupture.

As best shown in FIG. 4, plate 136 is shorter in length than film unit 36 so that when the film unit 36 is in the exposure position 103, pod 42 extends beyond the right-hand end of plate 136. This allows the portions of the film unit frame 41 immediately surrounding image forming area 40 to be urged against plate 136 by pressure plate 150 to accurately position the image forming area 40 of the film unit at the camera's exposure plane.

The means for effecting the exposure of a film unit 36 located at exposure position 103 include the objective lens 104 mounted in forward wall 18 with its optic axis shown as line 156 and the shutter 106 positioned behind lens 104.

Lens 104 is preferably mounted for axial movement for focusing purposes (although such structure is not shown in the drawings) but it could also be a fixed focus lens.

In the illustrated embodiment, shutter 106 comprises a pair of thin, elongated shutter blades 158 and 160 which are adapted to be driven by motor 130 simultaneously in opposite directions to bring a pair of apertures (not shown), one each in blades 158 and 160, into and out of registration with each other to selectively block and unblock the transmission of light from lens 104 to a film unit 36 located at the exposure position 103.

As best shown in FIG. 4, blades 158 and 160 are positioned in closely adjacent parallel relation to one another behind lens 104 and wall 18. The blades 158 and 160 extend through travel and guide slots 162 and 164, walls 120 and 118 and into compartment 128 where they are coupled to motor 130. Blade 158 includes a drive arm extension 166 at the top edge thereof which is formed as an elongated toothed rack that meshes with a shutter drive gear 170 mounted on the output shaft of motor 130. Blade 160 includes a similar toothed rack drive arm 172 at the bottom edge thereof which meshes with the underside of gear 170.

In a preferred embodiment, electrical motor 130 is of the reversible stepping type that is driven stepwise in predetermined arc segments by a train of incoming electronic pulse signals. The number of pulses in a train determine the total arc through which the output shaft is driven from a given starting point and the polarity of the signals determine the direction of shaft rotation.

In the illustrated embodiment, an electronic logic and power circuit for operating the shutter motor 130 is diagrammatically shown as box 173 along with a diagrammatic representation of a battery 174 for powering the circuit 173. Both of these components may be located in the chamber 92 just to the right of exposure chamber 90.

A scene light level signal is fed to circuit 173 from a photocell diagrammatically shown as a box 176 in chamber 128. The photocell 176 is positioned behind shutter blades 158 and 160 which have a second pair of apertures (not shown) therein which selectively block and unblock the transmission of scene light, in response to blade movement, to the photocell 176 through a photocell window 178 mounted in wall 18 in alignment with photocell 176.

The shutter blades 158 and 160 are normally located in the light blocking position. That is the corresponding exposure apertures and the photocell apertures in blades 158 and 160 do not overlap. In response to actuating button switch 108, the power and logic circuit 173 is energized and begins to feed a train of pulse signals to motor 130. If we assume the output shaft of motor 130 rotates in a clockwise direction (as viewed from the rear in FIG. 4), blade 158 will be driven towards the right while blade 160 is simultaneously driven to the left.

In response to the blade movement, the corresponding exposure apertures and photocell apertures in blades 158 and 160 overlap and form light transmission apertures to the film unit 36 at exposure position 103 and the photocell 176. As the blades 158 and 160 progress in their initial movement, the corresponding apertures overlap further to increase the effective diameters of these light transmission apertures. The photocell 176 "reads" the scene light and its output signal is fed to an integrating subcircuit in circuit 173. When a predetermined voltage level is reached by the integrating subcircuit, a trigger signal is provided which causes the logic system to reverse the polarity of the pulse train driving motor 130 thereby causing the output shaft of motor 130 to reverse its direction of rotation. This causes the shutter blades 158 and 160 to be driven in the opposite direction to close the light transmission apertures thereby terminating exposure. When the output shaft of motor 130 is driven back to its starting position, the pulse train is discontinued.

For a more detailed description of one type of stepping motor operated shutter that may be utilized in camera 10, reference may be had to U.S. Pat. No. 3,882,522 issued to Irving Erlichman on May 6, 1975 said patent being assigned to the same assignee as the present invention.

Subsequent to exposure, the film unit 36 is advanced from the exposure position 103, between the pressure applying rollers 94 and 96, and into the storage cassette 38 located at its operative position within storage cassette chamber 32 as best shown in FIG. 4.

Chamber 32 is bounded on its sides by walls 122 and 126. Wall 126 extends rearwardly from front housing wall 18 to a point adjacent roller 94. Wall 126 extends from front wall 18 to rear wall 20. Attached to the fixed wall 124, which extends between walls 122 and 126, is a leaf spring 180 which is in turn connected at its mid point by a pin 182, to a movable chamber wall section or cassette retaining plate 184. Retaining plate 184 includes a pair of vertically disposed dovetail shaped channels 186 and 188 therein for slidably receiving the conforming rails 86 and 88 on storage cassette 38. Chamber 32 is bounded on the top and bottom by door 28 and interior floor 112.

In FIG. 4, spring 182 is shown in its normal unstressed state thereby locating retaining plate 184 in its operative position wherein it accurately locates cassette 38 in operative relation with the bite line of rollers 94 and 96 such that a film unit 36 may enter cassette 38 through its opening 68 and assume the forwardmost position therein shown in FIG. 4 between the interior surface 66 of storage cassette forward wall 64 and the film engaging plate of spring platen 84.

The retaining plate 184 is mounted for movement toward and away from the forward wall 18 of camera housing 12 to facilitate the removal of cassette 38 from chamber 32. When cassette 38 is located in its operative position within chamber 32, as shown in FIG. 4, the exterior surface of its forward wall 64 is closely adjacent an end section 190 of the later-to-be-described retractable slide viewer 100. A pair of film engaging fingers 192 (shown in phantom lines in FIG. 4) on end section 190 extend outwardly therefrom and are positioned over cassette notches 80 and 82 and the top edge of the last or forwardmost film unit inserted into cassette 38. Thus to remove cassette 38 from chamber 32 it must be moved slightly away from viewer end section 190 so that forwardmost film unit 36 therein is clear of the fingers 192 and 194.

To facilitate grasping cassette 38, wall 124 and retaining plate 184 are formed so as to be shorter than the height of cassette 38 thereby providing access for a finger hold on cassette rear wall 62. Access to the forward cassette wall 64 is provided by a finger slot or depression 196 in viewer end section 190. Once the cassette 38 is grasped, it may be moved away from end section 190 against the bias of spring 180 and lifted out of chamber 32. In a preferred embodiment, the later-to-be-described fingers 192 and 194 on viewer end section 190 are formed of a resilient material and may be deflected slightly so that it is not necessary to move retaining plate 184 from its normal position to insert a cassette 38 into chamber 32.

To the right of chamber 32 is the view finder 98 which may be of the direct viewing type formed by an objective lens 198 mounted in front housing wall 18 and an eye lens 200 mounted in rear housing wall 12. The chamber between lenses 198 and 200 is bounded by wall 126, interior floor 112 and camera housing top and side walls 14 and 24, respectively.

As noted earlier, camera 10 is provided with a manually operable film advance and roller drive assembly 102.

Figure 12:
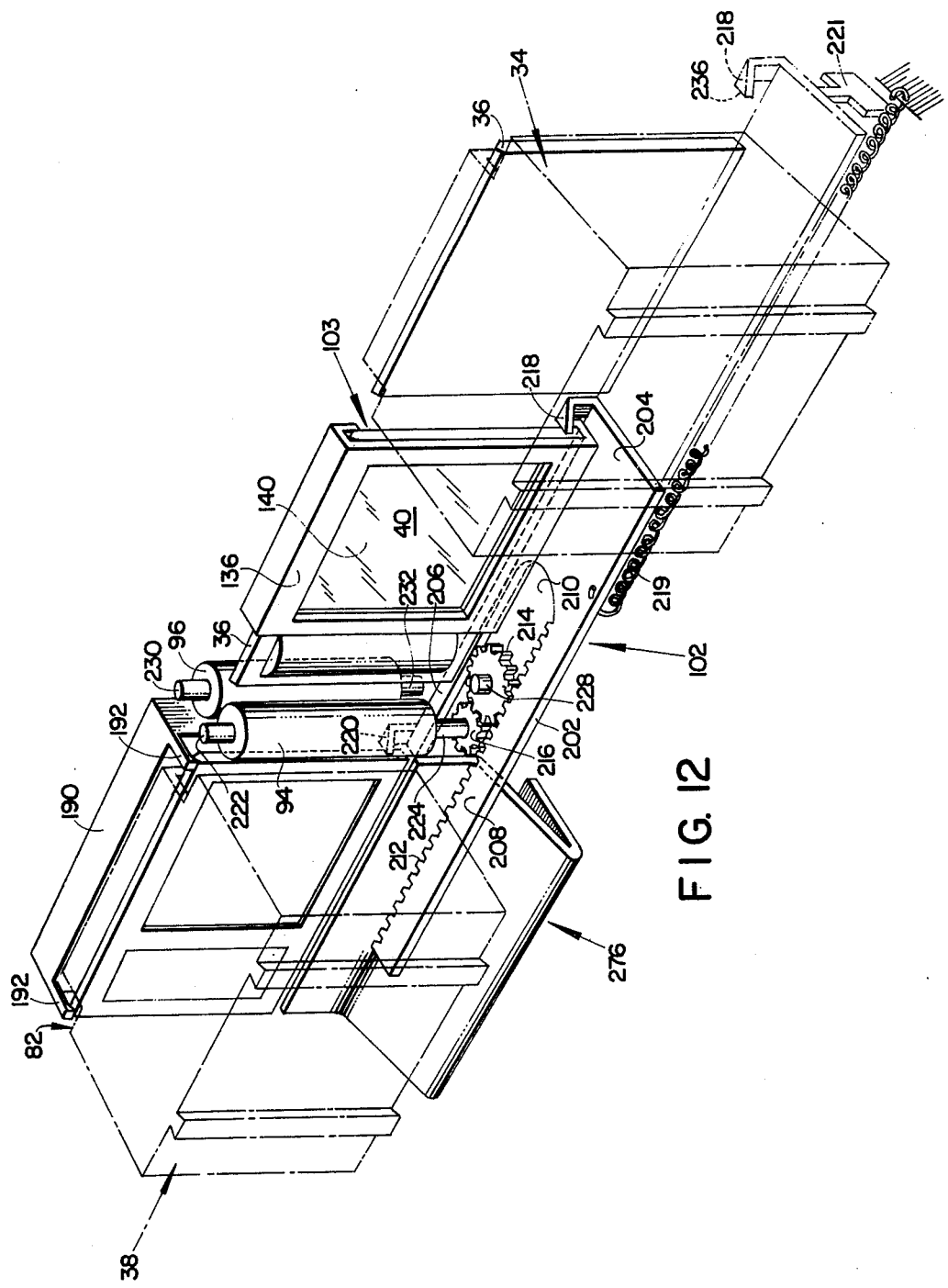
FIG. 12 is an isolated perspective view of the camera's film transport and pressure applying mechanism showing a film advance and roller drive means in its first position in dotted lines and in its second position in solid lines.

As best shown in FIG. 12, assembly 102 includes drive means or a thin drive plate 202 which is located in the slide channel or guide track 114 between the interior floor 112 and the bottom wall 16 of camera housing 12 for sliding movement between a normal first position (shown in phantom lines in FIG. 12) and a second position (shown in solid lines).

Extending from a trailing end section 204 of drive plate 202 is a short thin arm 206 and a longer second arm 208 spaced from arm 206 by a generally U-shaped slot 210. The interior edge of arm 208 (facing slot 210) is formed as a toothed rack 212 that is adapted to mesh with a roller drive gear 214 which is in turn in mesh with a roller gear 216 secured to the lower end of roller 94.

Extending upwardly and inwardly from the exterior edge of drive plate 202 that includes arm 206 is a first or rear film engaging pick 218 for advancing a film unit 36 from the supply cassette 34 to the exposure position 103 and a second or forward pick 220 for advancing a film unit 36 from the exposure position 103 into the bite of the pressure applying rollers 94 and 96. Pick 220 also preferably functions to assure that the film unit 36 is fully inserted into the storage cassette 38.

Depending from the bottom of end section 204 is a manually engageable tab 221 which the user employs to move assembly 102 from the first to the second position. A return spring 219 having one end secured to plate 202 and the other end recessed to camera housing 12 is provided to automatically return assembly 102 from the second position to the first position.

With reference to FIGS. 5 and 12, it will be seen that roller 94 includes a top journal shaft 222 which is journaled for rotation in a suitable bearing (not shown) in housing top wall 14 and an elongated bottom journal shaft 224 that is journaled for rotation in a suitable bearing (not shown) in housing bottom wall 16. The roller gear 216 is fixedly secured to shaft 224 and it is located partly in the slide channel 114 and partly in a clearance recess or depression 226 provided in bottom wall 16. The roller drive gear 214 is mounted for rotation about an axle or pin 228 which is coupled at its opposite ends to interior floor 112 and bottom wall 16. Drive gear 214 also is located partly in depression 226 and partly within channel 114 where it is in mesh with the rack 212 on arm 208.

The location of roller 94 is fixed. That is, it is adapted to rotate about a fixed axis of rotation. In a preferred embodiment of the invention, roller 96 is mounted for movement toward and away from roller 94 so as to vary the gap therebetween. As shown in FIG. 12, roller 96 includes a top journal shaft 230 and an elongated bottom journal shaft 232. Preferably shafts 230 and 232 are journaled in spring biased bearings located in roller mounting brackets (not shown) on top housing wall 14 and bottom housing wall 16. Roller 96 is normally urged towards fixed roller 94 to establish a minimum gap therebetween which in some respects will determine the thickness of the layer of processing fluid that is distributed within the film unit. As the thick pod 42 is advanced into the bite of the rollers, roller 96 moves away from roller 94 thereby simultaneously increasing the size of gap and the compressive force exerted on the pod because of the compression of the biasing springs. The increased force facilitates rupturing of the pod seal and as the fluid is released from the pod, roller 96 is urged back to its minimum gap position.

It will be noted that the relatively thin and elongated bottom journal shafts 224 and 232 of rollers 94 and 96 are spaced far enough apart, even when roller 96 is in its minimum gap configuration for the short arm 206 of drive plate 202, along with the second or forward pick 220 thereon, to pass between shafts 224 and 232 such that the pick 220 may extend beyond rollers 94 and 96 to the edge of cassette 38 to assure that a film unit 36 is fully inserted into storage cassette 38.

As best shown in FIGS. 4, 5 and 8, the picks 218 and 220 extend upwardly through an elongated guide slot 235 provided in interior floor 112 to position their respective film engaging surfaces 236 and 238 in line with the linear longitudinal path of travel of a film unit 36. The push tab 221 on the underside of drive plate 202 extends downwardly through an elongated slot 240 provided in housing bottom wall 16 for that purpose (see FIG. 3).

When the film advance and roller drive assembly 102 is in its first or normal position as shown in FIGS. 4 and 5, pick 220 is located in position to engage the lower trailing edge 242 of a film unit 36 located at the exposure position 103. Pick 218 however is spaced (to the left as viewed in FIGS. 4 and 5) from a corresponding trailing edge 242 of the forwardmost film unit 36 in storage cassette 34 and is located in a recess 244 provided in housing side wall 22.

As was noted earlier, pick 220 when moved from the first position to the second position, shown in phantom lines in FIG. 4, extends between the journal shafts 224 and 234 of rollers 94 and 96 to the edge of the storage cassette 38 to assure that a film unit 36 is fully inserted therein. Therefore the length of the path that pick 220 is required to travel is greater than the path length required to advance a film unit 36 from supply cassette 34 to exposure position 103. Because picks 218 and 220 are both fixedly mounted on the drive plate 202 of assembly 102 and must move the same distance when assembly 102 is advanced, the film engaging surface 236 of pick 218 must be set back from the trailing edge 242 of the forwardmost film unit 36 in supply cassette 34 by a distance representing the difference between these two path lengths.

Assume now that a new supply cassette 34 has been inserted into receptacle or chamber 30, an empty storage cassette 38 is in place in receptacle or chamber 32, there is no film unit 36 at exposure position 103, and the film advance and roller drive assembly 102 is in its first or normal position (all the way to the left as viewed in FIGS. 4 and 5).

To prepare for the first exposure, the user pushes tab 221 to the right causing assembly 102 to move from its first position to its second position.

Pick 218 moves forwardly and its film engaging surface 236 engages the trailing edge 242 of the forwardmost film unit 36 in supply cassette 34. Access to edge 242 is provided by the intersecting cassette openings 68 and 72. As pick 218 moves to the left, it advances or pushes film unit 36 out through the cassette exit opening 70 and into the top and bottom guide channels 142 and 144 of aperture plate 136. As noted earlier, the pressure plate 150 moves rearwardly slightly against the bias of spring 152 to allow the pod 42 of film unit 36 to advance between plates 136 and 150 without rupture. When fully advanced to the second position pick 218 locates film unit 36 at the exposure position 103. That is, pick 218 is in the position of pick 220 shown in solid lines in FIGS. 4 and 5.

It will be noted that the relatively thin construction of supply cassette forward wall 64 and the fact that it is unrestrained by camera structure allows it to flex outwardly slightly towards camera housing rear wall 20 to facilitate the passage of pod 42 through cassette opening 70.

This movement of assembly 102 to the right also causes pick 220 to advance to the right between roller shafts 224 and 230 and beyond rollers 94 and 96 to the edge of first vertical opening 72 in supply cassette 38. Roller 94 is also driven via rack 212 and gears 214 and 216.

Note that the active pressure applying portions of rollers 94 and 96 are shorter than the width of film unit 36 as measured between its top and bottom or lateral edges, to provide clearance and access at the bottom edge for the linear movement of pick 220 between the roller shafts.

Upon reaching the second position the user releases push tab 214 and assembly 102 turns to the first position moving to the left under the influence of return spring 219.

In a preferred embodiment the picks 218 and 220 are formed so as to be somewhat resilient and include inclined cam surfaces 246 and 248 which engage the bottom ends of the film units located at the forwardmost position in supply cassette 34 and at the exposure position 103 thereby camming the picks 218 and 220 rearwardly slightly out of their normal positions in alignment with the longitudinal film unit path of travel and allowing the picks to slide along the bottom ends of the film units 36 without moving them. As picks 218 and 220 move past the respective trailing edges 242 of the film units 36 at the forwardmost position in supply cassette 36 and at the exposure position 103, then snap forwardly slightly and return to their normal or non-stressed position in alignment with the longitudinal path of travel of film units 36.

The film unit 36 at exposure position 103 is then exposed in the manner noted earlier. Assembly 102 is then once again advanced to the right from the first position to the second position to cause the exposed film unit 36 to be advanced from the exposure position 103, between pressure applying rollers 94 and 96 and into the storage cassette 38 and to simultaneously cause the second, and now forwardmost film unit 36, in supply cassette to be advanced therefrom to the exposure position 103.

In the illustrated embodiment, the diameters and rotational velocity of rollers 94 and 96 are chosen such that once the leading edge of the exposed film unit is advanced into the bite thereof, the rollers 94 and 96 frictionally engage the film unit 36 and the driven roller 94 causes the film unit to be advanced therebetween at a slightly faster linear rate of travel than the linear rate of advance of the pick 220. That is, once there is sufficient frictional engagement with the rollers 94 and 96, they pull the film unit 36 away from and unload pick 220 to transfer the greatly increased force necessary to advance the film unit through the pressure applying roller from the rather lightly constructed pick 220 to the roller drive assembly 102.

As the film unit advances between rollers 94 and 96 they apply a compressive pressure progressively along the length thereof to effect pod rupture and fluid distribution between predetermined layers of the film unit.

As best shown in FIGS. 4 and 12, the film unit 36 emerges from the exit side of the rollers 94 and 96 and advances into the storage cassette 38 through the vertical opening 68 therein. The beveled camming surface 74 serves as a guide ramp for guiding the film unit into its proper position between the spring platen 84 and the interior surface 66 of cassette forward wall. In general, the rollers 94 and 96 provide sufficient momentum to the film unit 36 to cause it to be fully inserted into supply cassette 38 where it is held in position by the frictional forces provided by spring platen 84 urging the film unit against the interior surface 66 of cassette forward wall 66. However to assure that the film unit 36 is indeed fully inserted, the pick 220 extends between and beyond rollers 94 and 96 so as to be into position to engage the trailing edge 242 of the film unit and push all the way into cassette 38 if the rollers have not imparted sufficient momentum to achieve full insertion.

In addition to providing storage space for a plurality of processed film units, the storage chamber 38 also serves as a light-tight imbibition chamber for the film unit following its emergence from the pressure applying rollers 94 and 96. As noted earlier, the illustrated transparency type film units 36 do not include a self-contained light opacification system and the photosensitive materials therein must be protected from further exposure for a relatively short time following fluid distribution. Depending on the type of emulsion and processing fluid employed, the imbibition period may range from approximately 10 to 60 seconds.

The succeeding film units 36 are advanced, exposed, processed and stored in the same manner described above. Each movement of the assembly 102 from its first position to the second position causing an exposed film unit 36 to be advanced from position 103, through rollers 94 and 96 and into the storage cassette 38 (between the last inserted or forwardmost film unit and the interior surface 66 of the storage cassette forward wall 64) and also effecting the movement of a film unit 36 from supply cassette 34 to the exposure position 103. Upon return of the assembly 102 from its second position to the first position the picks 218 and 220 are once again located in alignment with the trailing edges 242 of the film units 36 to be advanced during the next actuation. It will be noted that roller drive gear 214 may include an elongated slot for pin 218 so that it will be in driving mesh with gear 216 when the assembly 102 is moved from the first position to the second position and then slide away from gear 216 when assembly 102 is moved in the opposite direction to prevent driving roller 94 on the return stroke.

Should the user wish to view the last inserted or forwardmost slide in storage cassette after the appropriate imbibition period, he merely pulls the magnifying slide viewer 100 downwardly from its first or retracted position shown in FIG. 1, to its extended position shown in FIG. 2, turns the camera housing 12 over as shown in FIG. 3, and views the slide through the magnifying eye lens 110.

As the slide viewer 100 is extended, it withdraws the forwardmost processed film unit or slide 36 in storage cassette 38 through the bottom opening 72 and supports the slide in alignment with the magnifying eye lens 110. In response to closing or retracting the viewer 100, the slide 36 is returned to its forwardmost position in storage cassette 38.

With reference now to FIGS. 2, 3, 4, 6 and 7, the slide viewer 100 comprises a generally U-shaped member including the previously noted first end section 190, a second and opposite end section 250, and a viewfinder cap or connecting wall 252 joining the end sections 190 and 250.

End section 190 is a frame-like member which mounts a light diffusing translucent screen 254 which provides a diffused light background against which the transparency slide is viewed. End section 250 mounts the magnifying eye lens 110 in spaced confronting alignment with screen 254.

Figure 6A:
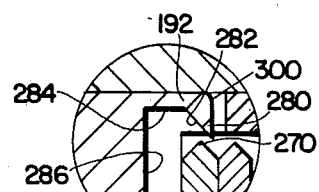
FIG. 6a is a magnified view of the circled area of FIG. 6 to show certain structural details of the slide viewer.
Figure 6:
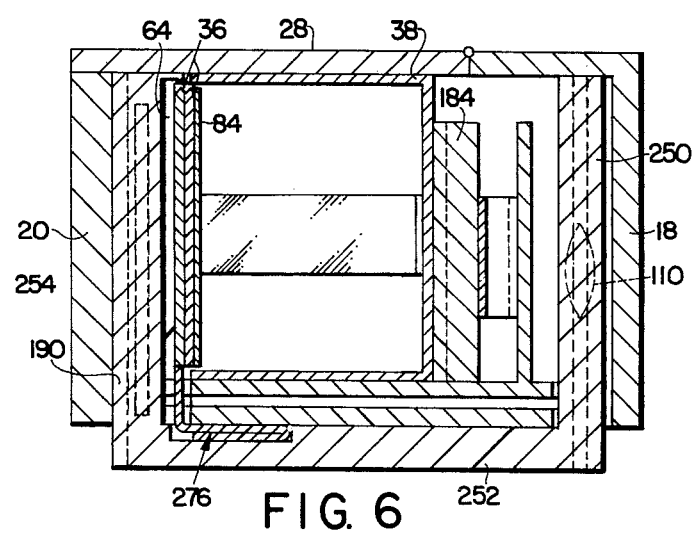
FIG. 6 is a side elevational view, partly in section, of the camera of FIG. 1 taken through the storage chamber and slide viewer located in its retracted position.

In the retracted position of FIGS. 4 and 6, the viewer 100 is located in telescoping or nesting relation with the storage and imbibition chamber or receptacle 30 and a storage cassette 38 therein. The first end section 190 extends upwardly through an opening 256 in bottom housing wall 16 and interior floor 112 adjacent rear housing wall 20, and the major portion of section 190 occupies a space designated 258 between the interior surface of rear wall 20 and the exterior surface of the forward wall 64 of cassette 38. The viewer cap 252 overlies (or underlies) housing bottom wall 16, and the second end section 250 extends upwardly through an opening 260 in bottom wall 16 and interior floor 112 adjacent front wall 18 such that the major portion of section 250 occupies a space designated 262 between interior wall 124 and front housing wall 18.

Figure 7:
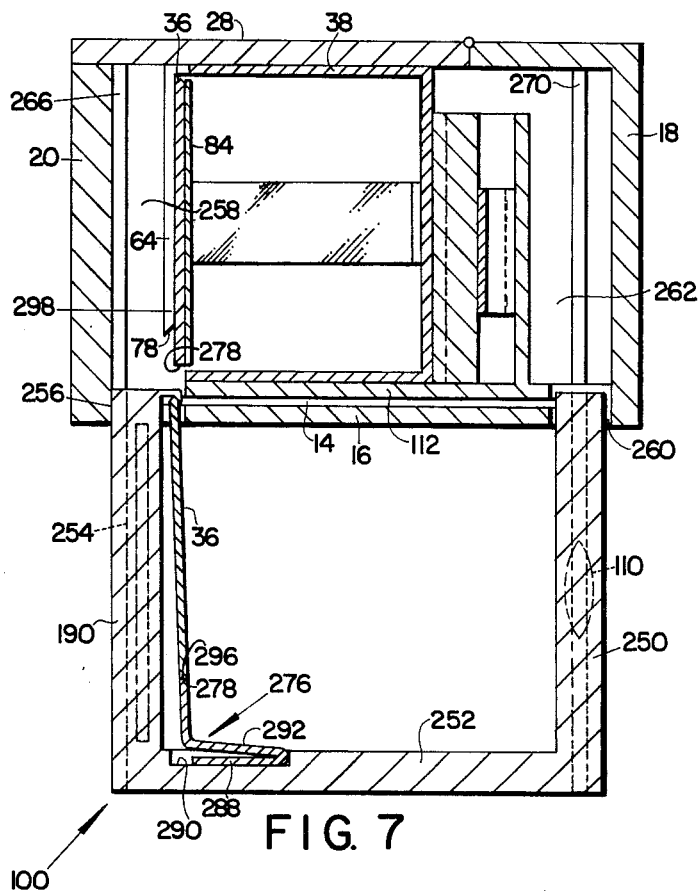
FIG. 7 is a side elevational view, partly in section, taken along the lines of FIG. 6 but showing the slide viewer in its extended position.

The viewfinder 100 is coupled to camera housing 12 for sliding movement relative thereto between its first or retracted position of FIGS. 4 and 6 and its second or extended position of FIGS. 2, 3 and 7 by means of a pair of dovetail shaped vertical channels 264 on end section 190 which receive a pair of complementary shaped vertical slide and guide rails 266 integrally formed with rear housing wall 20 and also by a pair of outwardly extending vertical slide rails 268 on the lateral sides of section 250 which slide in a pair of complementary guide channels 270 formed in interior walls 122 and 126.

Although not shown in the drawings, the end sections 190 and 250 preferably include top and bottom recesses formed therein for receiving resilient latching detents formed on housing walls 20 and 18 for releasably securing slide viewer 100 in its illustrated extended and retracted positions.

The viewer 100 includes means for engaging and supporting the forwardmost processed film unit or slide 36 in storage cassette 38 such that the slide 36 is withdrawn through the bottom opening 72 of cassette 38, in response to extending viewer 100, and supported in front of screen 254 and in alignment lens 110 for viewing and then is reinserted into the forwardmost position in cassette 38 through opening 72 in response to retracting or closing viewer 100.

The film engaging means included the pair of spaced hook-like resilient fingers 192 on the top end of end section 190 for engaging and supporting the opposite ends of the top and lateral edge 274 of the forwardmost slide 36 and a resilient spring-like member 276 mounted on viewer cap 250 for engaging and supporting the bottom and opposite lateral edge 278 of this slide.

As best shown in FIG. 6a, the fingers 192 project outwardly from the top end of section 190 over the notches 80 and 82 in the cassette top wall 54 that provide access to the opposite ends of the top edge 274 of the forwardmost slide 36. Each finger 192 includes a pointed tip 280, a rearwardly and upwardly inclined camming surface 282, and a horizontal support surface 284 between the vertical interior surface 286 of section 190 and camming surface 282. As shown in exaggerated fashion in FIG. 6a, the top and bottom edges 274 and 278 of slide 36 are slightly rounded to provide definition between adjacent stacked slides thereby facilitating the engagement of these edges by fingers 192 and spring member 276.

As best shown in FIGS. 6 and 7, spring member 276 comprises a horizontal base section 288 secured to viewer cap 252 in a recess 290 provided therein, a folded back and rearwardly and upwardly inclined intermediate section 292 shown in its partially loaded configuration in FIG. 7, and a generally vertical section 294 which terminates in a very shallow concave contoured edge 296 for engaging and supporting the bottom edge 278 of slide 36.

When the viewer 100 is fully retracted, the section 292 of spring member 276 engages the underside of housing wall 16 and section 292 is compressed between wall 16 and the base section 288 such that it overlies section 288 in recess 290. In this fully loaded or compressed position, spring section 294 extends up through opening 256 such that its film engaging edge 296 is aligned with and just engages the bottom edge 278 of the forwardmost slide 36. Also as shown in FIGS. 6 and 6a, the fingers 192 are positioned above and slightly spaced from the top edge 274 of the forwardmost slide 36.

As the viewer 100 is pulled downwardly, using the lateral edges of cap 252 as a hand hold, the fingers 192 move through cassette notches 80 and 82 and their pointed ends 280 are inserted between the forwardmost and next underlying slide 36 bringing the camming surfaces 282 of fingers 192 into engagement with the opposite lateral ends of top edge 274 of the forwardmost slide 36. This initial downward movement also begins to unload the fully compressed spring member 276 thereby allowing the vertical section 294 to move upwardly relative to cap 252 to maintain the film engaging edge 296 thereof in engagement with the bottom edge 278 of the forwardmost slide and urge the slide 36 upwardly against camming surfaces 282 of fingers 192.

With the forwardmost slide 36 so engaged, it is advanced downwardly with viewer 100 and withdrawn from cassette 38 through its bottom opening 72 to the viewing or fully extended position of FIG. 7 wherein its image forming area 40 is located below camera bottom wall 16 although the top portion of its frame 41 is not fully withdrawn from opening 256. Thus when located in the viewing position, the slide 36 is substantially exteriorally of the camera housing. It will be noted that the vertical cassette openings 68 and 70 provide the necessary clearance for fingers 192.

When, during the course of the downward movement or extension of viewer 100, the top edge 274 of the engaged slide 36 clears the bottom edge 298 of the storage cassette forward wall 64, the upward bias on slide 36 by spring member 276 causes the top edge 274 of slide 36 to ride up the inclined camming surfaces 282 until it is in engagement with the horizontal support surfaces 284 of fingers 192. This in effect tilts the engaged slide 36 slightly so that the top edge 274 is moved rearwardly slightly and is now vertically aligned with the bevel or camming surface 78 at the bottom edge of cassette forward wall 64 rather than in alignment with bottom edge 278 of the previously inserted slide 36 in cassette 38 which has moved into the forwardmost portion under the influence of the spring platen 84. The purpose of this slight rearward tilt is to facilitate reinsertion of the slide 36 supported by viewer 100. The small degree to which it is tilted is not discernible to the user viewing slide 36 through eye lens 110.

To reinsert slide 36 into storage cassette 38, the viewer 100 is moved upwardly from its extended position of FIG. 7 to its retracted position of FIG. 6.

As best shown in FIG. 6a, the top edge 300 of the fingers 192 are rounded. As the viewer 100 moves upwardly, edges 300 cam by the bottom edge 278 of the slide 36 located in the forwardmost position and urge it towards the interior of cassette 38 against the bias of spring platen 84. This spaces the bottom end of the forwardmost slide 36 away from the interior surface 66 of forward wall 64 near its bottom edge 298. The top edge 274 of the supported slide 36 engages the beveled camming surface 78 and is cammed inwardly slightly such that it is inserted between the interior surface 66 of cassette forward wall 64 and the forwardmost slide 36 and in this manner is reinserted into cassette 38 through opening 72 to resume the forwardmost position in response to moving viewer 100 to the fully retracted position.

Slide 36 is advanced upwardly into cassette 38 until it is stopped when the top edge 274 thereof engages the interior surface of cassette top wall 54. Further upward movement of viewer 100 causes the fingers 272 to become disengaged from the slide 36 as shown in FIG. 6a. Also it will be noted that spring member 276 is once again fully loaded or compressed such that it just engages the bottom edge 278 of slide 36 but does not provide an upward biasing force.

When the next film unit 36 is advanced from exposure position 103, through rollers 94 and 96 and into cassette 38 through opening 68, it is inserted into the forwardmost position and urges the slide 36 shown in the forwardmost position in FIG. 6 into the next underlying position against the bias of spring platen 84. The rounded bottom edge 278 of slide 36 and the very shallow contour of the film engaging edge 296 cooperate as complementary ramps such that the bottom edge 278 slides out of engagement with edge 296 to allow the slide to move into the next underlying position in storage cassette 38.

It will be noted that a film unit 36 is advanced along a first path of travel from the supply chamber or receptacle 30 to the storage and imbibition chamber 32 when camera 10 is operated in its film exposure and processing mode and is advanced along a second path of travel that is transversely oriented in direction with respect to the first path when the film unit 36 is moved from its storage position within chamber 32 to the viewing position substantially exteriorly of camera housing 12 and then back into chamber 32.

Although the illustrated camera 10 is configured to have at least one of the rollers 94 and 96 rotatably driven to effect the advancement of the exposed film unit 36 between the rollers and into the storage cassette 38, it is within the scope of the present invention to provide a self-developing camera in which neither of the rollers 94 and 96 are adapted to be rotatably driven. In such an embodiment, the exposed film unit 36 would be advanced from exposure position 103, between rollers 94 and 96 and into the forwardmost position in storage cassette 38 by the pick 220 since it is operative to advance between the roller shafts and beyond the exit side of the rollers to the edge of storage cassette 38. Of course, if pick 220 is to be used in this manner, the construction of the pick 220 may be somewhat heavier to handle the increased loading thereon and the film unit 36 would require a relatively stiff frame 41 surrounding its image forming area 40 to prevent film bending or deformation resulting from the required forces applied thereto by pick 220 to advance it between rollers 94 and 96.

Since certain changes may be made in the above miniature self-developing camera and the film cassette without departing from the scope of the invention herein involved, it is intended that all matter contained in the above description or shown in the accompanying drawings shall be interpreted as illustrative and not in a limiting sense.

What is claimed is:

1. A self-developing camera for exposing, processing, viewing and storing self-developing film units of the type including an integral supply of fluid processing composition adapted to be distributed between predetermined layers of the film unit subsequent to exposure, said self-developing camera comprising:

a camera housing;

means for locating such a self-developing film unit at an exposure position within said camera housing;

means for exposing the film unit located at said exposure position;

pressure applying means for applying a compressive pressure to the film unit subsequent to exposure to effect the distribution of the fluid processing composition;

means for defining a storage chamber within said camera housing and within which the film unit is adapted to be stored subsequent to the application of said compressive pressure, said storage chamber being configured such that a film unit located for storage therein is not visually accessible to the user of said camera for viewing; and film unit viewing means mounted on said camera housing for movement relative thereto between first and second positions for moving the film unit from a storage location in said storage chamber to a viewing position wherein the film unit is visually accessible for viewing in response to moving said film unit viewing means from said first position to said second position, for facilitating viewing of the film unit located at said viewing location, and for moving the film unit from said viewing position to a storage location in said storage chamber in response to moving said film unit viewing means from said second position to said first position.

2. The self-developing camera as defined in claim 1 wherein said film unit viewing means is operable to move the film unit from a storage location in said storage chamber to a viewing position substantially exteriorally of said camera housing and then to a storage location in said storage chamber.

3. The self-developing camera as defined in claim 1 wherein said film unit viewing means includes optical means arranged to provide the user with a magnified image of the film unit located at said viewing position.

4. The self-developing camera as defined in claim 1 wherein said film unit viewing means is mounted in telescoping relation with said storage chamber for movement between its said first and second positions.

5. The self-developing camera of claim 1 wherein the film unit is moved relative to said pressure applying means and into said storage chamber along a first path of travel and is moved from said storage chamber to said viewing position and back to said storage chamber along a second path of travel that is substantially transversely oriented in direction with respect to said first path of travel.

6. The self-developing camera as defined in claim 1 wherein said storage chamber is configured to receive and support a storage cassette for receiving and holding for storage a plurality of such film units subsequent to the application of the compressive pressure thereto, and said film unit viewing means is operable to move a film unit from a storage location in the storage cassette to said viewing position, and then back into a storage location in the storage cassette.

7. A self-developing camera for exposing, processing and viewing self-developing film units of the type including an integral supply of fluid processing composition adapted to be distributed between predetermined layers of the film unit, said camera also including provisions for storing a plurality of processed film units in a storge cassette, said camera comprising:

a camera housing including a receptacle therein for receiving and supporting such a storage cassette configured to hold a plurality of such film units;

means for locating such a self-developing film unit at an exposure position within said housing;

exposure means for exposing the film unit located at said exposure position;

a pair of rollers, rotatably mounted in said camera housing, for engaging the film unit subsequent to exposure and advancing the exposed film unit relative thereto and into the storage cassette located in said receptacle while applying a compressive pressure to the exposed film unit to effect the distribution of its fluid processing composition;

film advance means for advancing the film unit from said exposure position into engagement with said rollers;

roller drive means for rotatably driving at least one of said pair of rollers to effect the advancement of a film unit relative thereto and into the storage cassette; and film unit viewing means mounted on said camera housing for movement relative thereto between first and second position for moving a film unit from the storage cassette to a viewing position exteriorally of the storage cassette for viewing in response to moving said film unit viewing means from said first position to said second position, for facilitating viewing of the film unit located at said viewing position and for moving the film unit from said viewing position back into the storage cassette in response to moving said film unit viewing means from said second position to said first position.

8. The self-developing camera as defined in claim 7 wherein said film unit viewing means is operable to move the film unit from the storage cassette to a viewing position that is substantially exteriorally of said camera housing.

9. The self-developing camera of claim 7 wherein said rollers are configured to advance the film unit along a first path of travel into the storage cassette and said film unit viewing means is configured to move the film unit between the storage cassette and said viewing position along a second path of travel that is substantially transversally oriented in direction with respect to said first path of travel.

10. A self-developing camera for exposing, processing and viewing self-developing film units provided in a supply cassette holding a plurality of such film units, and for storing the plurality of film units in a storage cassette, said self-developing camera comprising:

a camera housing including first and second receptacle therein for receiving and supporting, respectively, such supply and storage cassettes at operative positions within said camera housing;

means for locating a self-developing film unit, provided from such a supply cassette located in said first receptacle, in position for exposure;

exposure means for exposing such a film unit located at said exposure position;

pressure applying means being operable to engage and advance such a film unit, subsequent to its exposure, relative thereto and into a storage cassette located in said second receptacle while applying a compressive pressure to the film unit to effect the distribution of a fluid processing composition between predetermined layers of the film unit;

first film advance means being operable for advancing such a film unit from the supply cassette in said first receptacle to said exposure position;

second film advance means being operable for advancing such a film unit from said exposure position into operable engagement with said pressure applying means; and film unit viewing means being operable for moving such a film unit out of the storage cassette in said second receptacle to a viewing position wherein the film unit is visually accessible to the user of the camera for viewing and for moving the film unit from said viewing position back into the storage cassette for storage.

11. A self-developing camera as defined in claim 10 wherein said film unit viewing means is mounted on said housing for movement relative thereto between extended and retracted positions and is operative for effecting the movement of a film unit from the storage cassette to said viewing position in response to moving said film unit viewing means from said retracted position to said extended position and is operative for effecting the movement of the film unit from said viewing position back into said storage cassette in response to moving said film unit viewing means from said extended position to said retracted position.

12. A self-developing camera as defined in claim 10 wherein said film unit viewing means includes optical means for providing a magnified image of a film unit located at said viewing position.

13. A self-developing camera as defined in claim 11 wherein said film unit viewing means is operable to locate a film unit at a viewing position that is substantially exteriorally of said camera housing when said film unit viewing means is located at said extended position.

14. A self-developing camera as defined in claim 10 which is operable for advancing a film unit along a first path of travel from a position in the supply cassette located in said first receptacle to said exposure position, then relative to said pressure applying means and into a position in the storage cassette located in said second receptacle and for moving a film unit between a position in the storage cassette and said viewing position along a second path of travel that is substantially transversely oriented in direction with respect to said first path of travel.

15. A self-developing camera as defined in claim 14 wherein said first path of travel is substantially linear.

16. A self-developing camera as defined in claim 15 wherein at least a portion of said second path of travel is located exteriorally of said camera housing.

17. A self-developing camera as defined in claim 14 further including means for effecting the simultaneous operation of said first and second film advance means and said pressure applying means to cause the advancement of such film units along said first path of travel.

18. A self-developing camera as defined in claim 17 wherein said means for effecting the simultaneous operation of said first and second film advance means and said pressure applying means is manually operable.

19. A self-developing camera as defined in claim 10 wherein said pressure applying means includes a pair of pressure applying rollers rotatably mounted in said camera housing, at least one of said rollers being configured to be rotatably driven to effect the advancement of an exposed film unit between said rollers and into the storage cassette, and further including drive means for simultaneously driving said first and second film advance means and said at least one roller to cause one film unit to be advanced from said exposure position into engagement with said pair of rollers and then into the storage cassette and another film unit to be advanced from the supply cassette to said exposure position vacated by the one film unit during the course of a cycle of simultaneous operation of said rollers and said first and second film advance means.

20. A self-developing camera as defined in claim 19 wherein said drive means is manually operable.

21. A self-developing camera as defined in claim 19 wherein said first and second film advance means include first and second picks for engaging respectively trailing edges of film units located in the supply cassette and at said exposure position and said drive means includes a drive member having said first and second picks fixedly positioned thereon in spaced relation, said drive member being mounted for movement relative to said camera housing between first and second such that during the course of movement of said drive member from said first position to said second position, said first pick engages the trailing edge of a film unit in the supply cassette and advances it to said exposure position and said second pick engages the trailing edge of a film unit at said exposure position and advances it into engagement with said pair of rollers.

22. A self-developing camera as defined in claim 21 wherein said drive member is configured to advance said second pick beyond said pair of rollers to engage the trailing edge of a film unit inserted into the storage cassette by said pair of rollers and advance the film unit into a fully inserted position in the storage cassette in the event the film unit was not fully inserted by said pair of rollers.

23. A self-developing camera as defined in claim 22 wherein said drive means includes at least one rotatably mounted gear configured to provide rotary drive to said at least one roller and said drive member includes a rack thereon which meshes with and drives said gear in response to moving said drive member from said first position to said second position.

24. A self-developing camera as defined in claim 23 wherein said drive member and said first and second picks therein advance along a linear path of travel in response to moving said drive member from said first position to said second position, and said pair of rollers and roller drive means are configured such that the rollers advance a film unit therebetween at a faster linear rate of travel than the linear rate of travel of said second pick, such that a film unit advanced into engagement with said pair of rollers by said second pick is pulled away from said second pick when it is being advanced by said pair of rollers.

25. A self-developing camera as defined in claim 10 wherein the self-developing film units used therein are of the type required to be maintained in a light excluding environment for an imbibition period following the distribution of the processing fluid and said second receptacle includes a light excluding imbibition chamber formed within said camera housing.

26. A self-developing camera including provisions for storing a plurality of processed self-developing film units in stacked relation within a storage cassette located in said camera and for selectively moving such film units from the storage cassette to a viewing position and then back into the storage cassette, said storage cassette being of the type including a first opening through which a film unit is adapted to be initially inserted into the storage cassette to assume the forwardmost position in the stack, a second opening through which the forwardmost film unit is adapted to be withdrawn from the storage cassette for movement to the viewing position and thereafter reinserted into the forwardmost position in the storage cassette for storage, and a third opening which provides access to an edge of the forwardmost film unit to facilitate its engagement for movement between the storage cassette and the viewing position, said self-developing camera comprising:

a camera housing including a receptacle for receiving and locating such a storage cassette at an operative position within said camera housing wherein the first cassette opening is located in position to have a self-developing film unit advanced therethrough for initial insertion into the forwardmost position in the storage cassette following its exposure and the application of a compressive pressure thereto to effect the distribution of processing composition within the film unit; and film unit viewing means mounted on said camera housing for movement relative thereto between retracted and extended positions for moving the forwardmost film unit out of the storage cassette through the second opening therein to a viewing position in response to moving said film unit viewing means from said retracted position to said extended position, for facilitating viewing of a film unit located at said viewing position and for moving the film unit through the second opening and back into the forwardmost position in the storage cassette in response to moving said film unit viewing means from said extended position to said retracted position, said film unit viewing means including first film engaging means configured to extend through said third cassette opening for releasably engaging the one edge of the forwardmost film unit accessible therethrough and second film engaging means for engaging an edge of the film unit opposite the one edge and for cooperating with said first film engaging means to releasably engageably support therebetween the film unit on said film unit viewing means to effect the movement of the film unit from its forwardmost position in the storage cassette to said viewing position in response to moving said film unit viewing means from said retracted to said extended position and from said viewing position back to said forwardmost position in response to moving said film unit viewing means from said extended position to said retracted position.

27. A self-developing camera as defined in claim 26 wherein said second film engaging means includes a spring member for engaging the opposite edges of the film unit and providing a biasing force for urging the film unit towards said first film engaging means to effect the supporting of the film unit between said first and second film engaging means, said second film engaging means being mounted on said film unit viewing means so as to be restrained by a portion of said camera when said film unit viewing means is located in said retracted position whereby said spring member does not provide said biasing force and so as to be unrestrained when said film unit viewing means is moved away from said retracted position towards said extended position to provide said biasing force.

28. A self-developing camera as defined in claim 29 wherein said film unit viewing means includes a generally U-shaped member having a first end section mounting at least said first and second first engaging means thereon and on which the film unit is supported for viewing, a second end section, opposite and spaced from said first end section, having optical means mounted thereon for facilitating viewing of a film unit located in said viewing position when said U-shaped member is located in said extended position, and a base section connecting said first and second end sections.

29. A self-developing camera as defined in claim 28 wherein said camera housing includes first and second passageways in which said first and second end sections of said U-shaped member are configured to slide, respectively, for movement between said retracted and extended positions.

30. A self-developing camera as defined in claim 28 wherein first and second passageways are located on opposite sides of said receptacle such that said first passageway locates said first end section in confronting relation with the forwardmost film unit located in a storage cassette in said receptacle.

31. A self-developing camera as defined in claim 28 wherein major portions of first and second end sections of said U-shaped member are located within said camera housing and said base section overlies an exterior wall of said housing in closely adjacent relationship thereto when said film unit viewing means is located in said retracted position and major portions of said first and second end sections are located exteriorally of said camera housing and said base section is spaced from said housing wall when said film unit viewing means is located in said extended position.

32. A self-developing camera as defined in claim 26 wherein said film unit viewing means is configured to move the forwardmost film unit in the storage cassette to a viewing position that is substantially exteriorally of said camera housing.

33. A self-developing camera for use with self-developing film units provided in a supply cassette holding a stack of such film units therein, said camera including provisions for storing such film units in a storage cassette subsequent to exposure and the application of a compressive pressure thereto to effect the distribution of a fluid processing composition within the film unit, said camera comprising:
a compact elongated generally parallelepiped shaped camera housing having its long dimension extending between opposed first and second side walls thereof;
a plurality of stations sequentially arranged in side by side relation along said long dimension of said camera housing from said first side wall toward said second side wall including:
  a. a film supply station including a supply chamber for receiving and supporting a supply cassette holding a stack of such film units therein;
  b. an exposure station including means for locating a film unit provided from the supply cassette in said supply chamber in position for exposure;
  c. a processing station including a pair of pressure applying rollers, at least one of which is configured to be rotatably driven such that said rollers engage a film unit advanced from said exposure position and advance the film unit relative thereto while applying a compressive pressure to the film unit to effect the distribution of the processing fluid; and
  d. a film storage station including a storage chamber for receiving and supporting a storage cassette in position to receive a film unit advanced thereinto from said pressure applying rollers;
exposure means for exposing a film unit located at said exposure position;
first and second film advance means configured to be driven simultaneously for advancing, respectively, one film unit from the supply cassette to said exposure position and another film unit from said exposure position into engagement with said pair of pressure applying rollers; and
drive means for simultaneously driving said at least one roller and said first and second film advance means.

34. A self-developing camera as defined in claim 33 further including film unit viewing means mounted on said camera housing for movement relative thereto between retracted and extended positions, said film unit viewing means being operable for moving a film unit out of the storage cassette to a viewing position in response to moving said film unit viewing means from said retracted position to said extended position and for moving the film unit from said viewing position back into the storage cassette in response to moving said film unit viewing means from said extended position to said retracted position.

35. A self-developing camera as defined in claim 34 wherein said film unit viewing means includes optical means for providing the user of said camera with a magnified image of a film unit located at said viewing position.

36. A self-developing camera as defined in claim 34 wherein said film unit viewing means is mounted for movement between its retracted and extended positions along a path of travel that is transverse in its directional orientation with respect to the directional orientation of the long dimension of said camera housing, and said viewing position is substantially exteriorally of said camera housing.

37. A self-developing camera as defined in claim 33 wherein said storage chamber is light tight and also functions as an imbibition chamber.

38. A self-developing camera as defined in claim 33 wherein said drive means is manually operable.

39. A self-developing camera as defined in claim 33 wherein said plurality of stations further includes a viewfinder station including a viewfinder positioned between said storage chamber and said second side wall of said camera housing for viewing and framing the scene to be photographed.

40. A self-developing camera as defined in claim 33 including at least one gear adapted to be rotatably driven to impart rotary motion to said at least one roller and said drive means includes a slider member mounting said first and second film advance means thereon and including a toothed rack for rotatably driving said one gear, said slider member being mounted on said camera housing for sliding movement relative thereto between first and second positions and being configured to simultaneously advance said first and second film advance means and rotatably drive said one gear in response to moving said slider member from said first position to said second position.

41. A self-developing camera as defined in claim 40 wherein said slider member is manually operable.

42. A self-developing camera as defined in claim 40 wherein said second film advance means extends beyond said rollers to an edge of the storage cassette in said supply chamber when said slider member is located in said second position for engaging and advancing a film unit into a fully inserted position in the storage cassette in the event such a film unit was not fully inserted into the storage cassette by said pair of rollers.

43. A self-developing camera for use with self-developing film units provided in a supply cassette holding a stack of such film units therein, said camera also including provisions for storing such film units in a storage cassette subsequent to exposure and the application of a compressive pressure thereto to effect the distribution of a fluid processing composition within the film unit, said camera comprising:
  a compact elongated generally parallelepiped shaped camera housing having its long dimension extending between opposed first and second side walls thereof;
  a plurality of stations sequentially arranged in side-by-side relation along said long dimension of said camera housing from said first side wall towards said second side wall including:
   a. a film supply station including a supply chamber for receiving and supporting a supply cassette holding a stack of such film units therein;
   b. an exposure station including means for locating a film unit provided from the supply cassette in said supply chamber in position for exposure;
   c. a processing station including a pair of pressure applying rollers for applying a compressive pressure to an exposed film unit advanced from said exposure position to effect the distribution of the processing fluid; and
   d. a film storage station including a storage chamber for receiving and supporting a storage cassette in position to receive a film unit advanced thereinto from said pressure applying rollers;
  exposure means for exposing a film unit located at said exposure position;
  means operable to effect the advancement of one film unit from said exposure position, to said pair of rollers and then into the storage cassette in said storage chamber and to simultaneously advance another film unit from the supply cassette in said supply chamber to said exposure position; and
  film unit viewing means mounted on said camera housing for movement relative thereto between first and second positions for moving a film unit from a storage location in the storage cassette in said storage chamber to a viewing position substantially exteriorly of the storage cassette in response to moving said film unit viewing means from said first position to said second position and for moving the film unit from said viewing position to a storage location in the storage cassette in response to moving said film unit viewing means from said second position to said first position.

44. A self-developing camera as defined in claim 43 wherein the supply and storage cassettes are substantially identical in construction and are interchangeable in that the supply cassette is used as the storage cassette after the film units initially provided in the supply cassette are removed therefrom and said supply and storage chambers are configured to interchangeably receive and support such supply and storage cassettes.

45. A self-developing camera as defined in claim 43 wherein said plurality of stations further includes a viewfinder station including means for viewing and framing the scene to be photographed.

46. A photographic system comprising:
  a supply cassette holding a stack of self-developing film units therein;
  a storage cassette for receiving and storing such film units therein subsequent to exposure and the application of a compressive pressure thereto to effect the distribution;
  said supply and storage cassettes being substantially identical in construction and being interchangeable in that said supply cassette is used as said storage cassette after the film units initially provided in said supply cassette are removed therefrom;
  in combination with a self-developing camera including:
  a compact elongated camera housing having its long dimension extending between opposed first and second side walls thereof;
  a plurality of stations sequentially arranged in side by side relation along said long dimension of said camera housing from said first side wall toward said second side wall including:
   a. a film supply station including a supply chamber for receiving and supporting said supply cassette holding a stack of self-developing film units therein;
   b. an exposure station including means for locating a film unit provided from said supply cassette in said supply chamber in position for exposure;
   c. a processing station including a pair of pressure applying rollers for applying a compressive pressure to an exposed film unit advanced from said exposure position to effect the distribution of the processing fluid; and
   d. a film storage station including a storage chamber for receiving and supporting said storage cassette in position to receive a film unit advanced thereinto from said pressure applying rollers, said supply and storage chambers being configured to interchangeably receive and support said interchangeable supply and storage cassettes;
  exposure means for exposing a film unit located at said exposure position;
  means operable to effect the advancement of one film unit from said exposure position to said pair of rollers and then into said storage cassette in said storage chamber and another film unit from said supply cassette in said supply chamber to said exposure position; and
  film unit viewing means mounted on said camera housing for movement relative thereto between first and second positions for moving a film unit from a storage location in said storage cassette in said storage chamber to a viewing position substantially exteriorly of said storage cassette in response to moving said film unit viewing means from said first position to said second position and for moving the film unit from said viewing position to a storage location in said storage cassette in response to moving said film unit viewing means from said second position to said first position.

47. A self-developing camera for exposing and processing self-developing film units provided in a supply cassette holding a stack of such film units therein and for storing such film units in a storage cassette, the self-developing film units being of the type having a given dimension as measured between lateral edges thereof and including an integral supply of fluid processing composition adapted to be distributed between predetermined layers of the film unit in response to progressively applying a compressive pressure along the length of the film unit intermediate its lateral edges, said camera comprising:

a camera housing;

means for defining a supply chamber within said camera housing for receiving and supporting such a supply cassette holding a stack of self-developing film units therein;

means for locating a film unit provided from the supply cassette in said supply chamber in position for exposure;

exposure means for exposing a film unit located at said exposure position;

a pair of pressure applying rollers for engaging a film unit advanced from said exposition position and progressively applying a compressive pressure along the length of the film unit intermediate its lateral edges as it is advanced relative to said rollers to effect the distribution of the processing fluid therein, at least one of said pair of rollers being shorter in width than the given dimension of the film unit to provide access to one edge of the film unit adjacent at least one of the film unit's lateral edges;

means for defining a storage chamber within said camera housing for receiving and supporting such a storage cassette in position to receive for storage therein a film unit being advanced from said pair of rollers subsequent to the application of the pressure thereto; and film advancing means including a first pick for engaging one film unit located in the supply cassette and advancing the one film unit therefrom to said exposure position and a second, operable simultaneously with said first pick, for engaging the one edge of another film unit located in said exposure position and advancing the film unit from said exposure position, between said pressure applying rollers, and into a storage locating position in the storage cassette, said second pick being mounted in alignment with the one edge of the film unit located at said exposure position for movement from said exposure position, along a path between portions of said pair of rollers and beyond said rollers towards the storage cassette a distance sufficient to insure that the film unit is fully inserted into the storage cassette.

48. A cassette for holding a stack of thin rectangular self-developing film units of a predetermined size therein and being configured for interchangeable use with a self-developing camera as both a supply cassette for holding a stack of unexposed film units and, after the film units initially supplied therein are removed, as a storage cassette for holding a stack of film units subsequent to exposure and processing, the self-developing camera being of the type including means for advancing a film unit along a first path of travel from a forwardmost position in a stack in a supply cassette to an exposure position and then through a processing station to a forwardmost storage position in the stack in a storage cassette and viewing means for moving a film unit along a second path of travel, that is orientated in perpendicular relation to the first path of travel, between the forwardmost storage position in the storage cassette and a viewing position substantially exteriorally of the storage cassette, said cassette comprising:

a rectangular box-like container dimensioned to hold a stack of such thin rectangular self-developing film units therein and including opposed top and bottom walls, a pair of opposed side walls joining said top and bottom walls along lateral edges thereof, a rear wall joining said top, bottom and pair of side walls along trailing edges thereof and a forward wall having an interior surface against which a film unit is adapted to bear to assume the forwardmost position in said cassette, said forward wall being configured to depend from a leading edge of a central portion of said top wall that extends forwardly of leading edges of said pair of said walls and said bottom wall to space said interior surface of said forward wall therefrom by a distance approximating the thickness of such a film unit, said forward wall being parallel to but narrower and shorter than said rear wall and including a pair of opposed lateral edges and a bottom edge which cooperate, respectively, with said leading edges of said pair of side walls and said bottom wall to define first, second and third interconnected elongated openings in said container dimensioned to allow the passage of such a film unit therethrough, said first and second openings being disposed on opposite sides of said container in adjacent parallel relation to said pair of side walls and said third opening being disposed in adjacent parallel relation to said bottom wall so as to be perpendicularly orientated with respect to said first and second openings, said container further including a fourth opening therein defined by a lateral edge of said central portion of said top wall and a recessed portion of a leading edge of said top wall adjacent thereto, said fourth opening being disposed in communicating alignment with one of said first and second openings;

so that when said cassette is used as a supply cassette in such a self-developing camera said first and third openings cooperate to provide access to an edge of the forwardmost film unit that is adapted to be engaged by the means for advancing a film unit along the first path of travel and said second opening serves as an exit opening through which the forwardmost film unit is advanced to the exposure station and when said cassette is used as a storage cassette in such a self-developing camera, said first opening serves as an entrance opening through which a film unit advanced along the first path of travel is inserted into said cassette to assume the forwardmost storage position, said third opening serves as both an exit and entrance opening through which a film unit is moved along the second path of travel between the forwardmost storage position and the viewing position and said fourth opening cooperates with its aligned one of said first and second openings to provide access to an edge of the forwardmost film unit to be engaged by the viewing means of the camera to move the forwardmost film unit between its forwardmost storage position and the viewing position.

* * * * *